(12) United States Patent
Spitz et al.

(10) Patent No.: US 11,140,814 B2
(45) Date of Patent: Oct. 12, 2021

(54) WORK VEHICLE HAVING DISPLAY UNIT

(71) Applicant: KUBOTA CORPORATION, Osaka (JP)

(72) Inventors: David Spitz, Atlanta, GA (US); Chad Plavcan, Atlanta, GA (US); Justin McCallister, Cleveland, GA (US); Min Sung Kim, Atlanta, GA (US)

(73) Assignee: KUBOTA CORPORATION, Osaka (JP)

(*) Notice: Subject to any disclaimer, the term of this patent is extended or adjusted under 35 U.S.C. 154(b) by 176 days.

(21) Appl. No.: 15/984,860

(22) Filed: May 21, 2018

(65) Prior Publication Data

US 2019/0350130 A1 Nov. 21, 2019

(51) Int. Cl.
*A01D 34/00* (2006.01)
*B60W 50/14* (2020.01)
*A01D 101/00* (2006.01)

(52) U.S. Cl.
CPC ........... *A01D 34/006* (2013.01); *B60W 50/14* (2013.01); *A01D 2101/00* (2013.01); *B60W 2050/143* (2013.01); *B60W 2050/146* (2013.01); *B60W 2710/0644* (2013.01)

(58) Field of Classification Search
USPC .......................................................... 701/36
See application file for complete search history.

(56) References Cited

U.S. PATENT DOCUMENTS

| 8,991,143 | B2 | 3/2015 | Fujiwara et al. | |
| 9,491,903 | B2* | 11/2016 | Dwyer | A01D 34/824 |
| 9,575,628 | B2 | 2/2017 | Meegan et al. | |
| 9,714,089 | B1* | 7/2017 | Louw | B64C 39/024 |
| 9,794,652 | B2* | 10/2017 | Nohra | H04Q 9/00 |
| 10,058,031 | B1* | 8/2018 | Brown | B60R 16/0231 |
| 10,067,503 | B2* | 9/2018 | Li | B64C 39/024 |
| 10,528,233 | B2 | 1/2020 | Spitz | |
| 2003/0004814 | A1* | 1/2003 | Roseen | G07G 1/0036 705/22 |
| 2006/0069463 | A1* | 3/2006 | Kim | G08B 13/1966 700/245 |

(Continued)

FOREIGN PATENT DOCUMENTS

WO WO-2017186372 A1 * 11/2017 ........ H01M 10/4257

OTHER PUBLICATIONS

NPL, Workstart® Series for 7300, 7400, 7500, 7600 Models, Navistar International, (http://rtrtruckrentals.com/garbage-truck-rental-manuals/international-work-star-manual.pdf)(2010)(hereinafter "Navistar") that published in 2010.*

*Primary Examiner* — Jean Paul Cass
(74) *Attorney, Agent, or Firm* — Greenblum & Bernstein, P.L.C.

(57) ABSTRACT

A work vehicle includes a detection signal processing section for processing detection signals from a group of sensors mounted on a vehicle body and outputting detection result data and a display unit for displaying the detection result data. The display unit includes a first displaying area for displaying time changing data included in the detection result data, the time changing data changing over time, a second displaying area for displaying safety data included in the detection result data, the safety data relating to safety confirmation, and a third displaying area for displaying alarm-relating data included in the detection result data.

12 Claims, 5 Drawing Sheets

(56) References Cited

U.S. PATENT DOCUMENTS

| | | | | |
|---|---|---|---|---|
| 2010/0321899 A1* | 12/2010 | Vossoughi | H04M 1/0254 | 361/728 |
| 2012/0283907 A1* | 11/2012 | Lee | B60T 8/17557 | 701/31.9 |
| 2013/0268165 A1* | 10/2013 | Hashima | A01D 34/80 | 701/50 |
| 2013/0276751 A1* | 10/2013 | Raasch | F02M 19/12 | 123/352 |
| 2013/0343906 A1* | 12/2013 | Funke | A01D 34/006 | 417/10 |
| 2015/0109104 A1* | 4/2015 | Fadell | H04L 67/12 | 340/5.65 |
| 2015/0109112 A1* | 4/2015 | Fadell | G08B 19/005 | 340/328 |
| 2015/0109128 A1* | 4/2015 | Fadell | G08B 3/10 | 340/540 |
| 2015/0112885 A1* | 4/2015 | Fadell | G08B 25/008 | 705/330 |
| 2015/0116106 A1* | 4/2015 | Fadell | G08B 19/005 | 340/501 |
| 2015/0116107 A1* | 4/2015 | Fadell | G08B 27/003 | 340/501 |
| 2015/0116108 A1* | 4/2015 | Fadell | G06Q 10/083 | 340/501 |
| 2015/0116109 A1* | 4/2015 | Fadell | G08B 19/005 | 340/501 |
| 2015/0120015 A1* | 4/2015 | Fadell | G06Q 10/0631 | 700/90 |
| 2015/0120596 A1* | 4/2015 | Fadell | G06Q 10/0631 | 705/330 |
| 2015/0120598 A1* | 4/2015 | Fadell | G06Q 10/0631 | 705/333 |
| 2015/0127712 A1* | 5/2015 | Fadell | G08B 25/008 | 709/202 |
| 2015/0145643 A1* | 5/2015 | Fadell | G08B 27/003 | 340/5.51 |
| 2015/0154850 A1* | 6/2015 | Fadell | G08B 29/185 | 340/501 |
| 2015/0156030 A1* | 6/2015 | Fadell | G06Q 10/063 | 700/90 |
| 2015/0156031 A1* | 6/2015 | Fadell | G08B 19/005 | 700/276 |
| 2016/0107749 A1* | 4/2016 | Mucci | G08B 29/185 | 701/3 |
| 2017/0091710 A1* | 3/2017 | Van Dyke | G05D 1/101 | |
| 2017/0196164 A1 | 7/2017 | Bryant et al. | | |
| 2019/0186035 A1* | 6/2019 | Haghdoost | C25D 3/562 | |
| 2019/0187869 A1 | 6/2019 | Spitz | | |
| 2019/0248007 A1* | 8/2019 | Duffy | B25J 9/08 | |
| 2019/0259232 A1* | 8/2019 | Nandakumar | G07F 17/10 | |
| 2019/0359059 A1 | 11/2019 | Spitz | | |

\* cited by examiner

WORK VEHICLE HAVING DISPLAY UNIT

TECHNICAL FIELD

This invention relates to a work vehicle having a display unit for reporting various information to a driver.

BACKGROUND ART

A work vehicle disclosed in U.S. Pat. No. 8,991,143 includes a mower unit as a utility implement and a flat display panel for displaying various kinds of data relating to a work run. A display screen of the display panel includes a fuel displaying area, a water temperature displaying area, an engine rotational speed displaying area, and an hour meter displaying area. A remaining fuel amount is displayed in the form of a bar graph showing a full tank state as 100% and an empty tank state as 0%. Water temperature is displayed in the form of a bar graph showing a hot state as 100% and a cool state as 0%. An engine rotational speed is displayed in the form of seven-segment number.

U.S. Pat. No. 9,575,628 discloses a display system for a work vehicle. This display system includes many screen pages, one of which includes a displaying area for displaying a remaining fuel amount, a vehicle speed, a fuel amount consumed per unit period.

In the case of a display mounted on a grass mower according to U.S. Patent Publication No. 2017/0196164, this display is capable of displaying an hour meter (accumulated engine run time), a water temperature, an engine rotational speed, a remaining fuel amount, a PTO clutch state, a parking brake state, etc.

In the case of a work vehicle, its driver needs to grasp reliably and easily, through its display unit, vehicle information that continuously changes over time during run, information for confirming safety, operational information indicating a result of an operation by the driver, etc.

SUMMARY OF THE INVENTION

The object of the present invention is to provide a work vehicle that can provide, through its display unit, a driver with important information during a work run, in a readily understandable manner.

A work vehicle according to the present invention comprises:
  a group of sensors mounted on a vehicle body;
  a detection signal processing section for processing detection signals from the group of sensors and outputting detection result data; and
  a display unit for displaying the detection result data, the display unit including:
    a first displaying area for displaying time changing data included in the detection result data, the time changing data changing over time,
    a second displaying area for displaying safety data included in the detection result data, the safety data relating to safety confirmation, and
    a third displaying area for displaying alarm-relating data included in the detection result data.

With the above-described arrangement, three kinds of data, i.e. time changing data, safety data and alarm data, whose features are distinct from each other are displayed in specific displaying areas provided separately. So, the driver can reliably grasp their contents and can cope with them speedily. For instance, the driver can maintain stable vehicle run, by viewing a vehicle speed, an engine rotational speed, a remaining fuel amount, etc. which change over time and displayed in the first displaying area. The driver can confirm safety, by viewing a state of a parking brake, a state of an operational lever, a state of PTO output, etc. which are displayed in the second displaying area. Further, the driver can take speedy measure by finding any alarm such as an overheated state, a fuel exhaustion, a battery exhaustion, etc. which are displayed in the third displaying area.

The display data in the second displaying area and the third displaying area are data that respectively indicate selectable values, which are generally displayed as two states. Therefore, in order to display such information, two states of illumination and disillumination of a lamp using LED, or the like can be employed advantageously. Further, in this case, as illumination colors therefor, a green (or blue) lamp can be employed for the safety data for safety confirmation and a red lamp can be employed for the alarm data for alarming. With this, ergonomically advantageous displaying mode can be realized.

EMBODIMENTS

Figure 1:
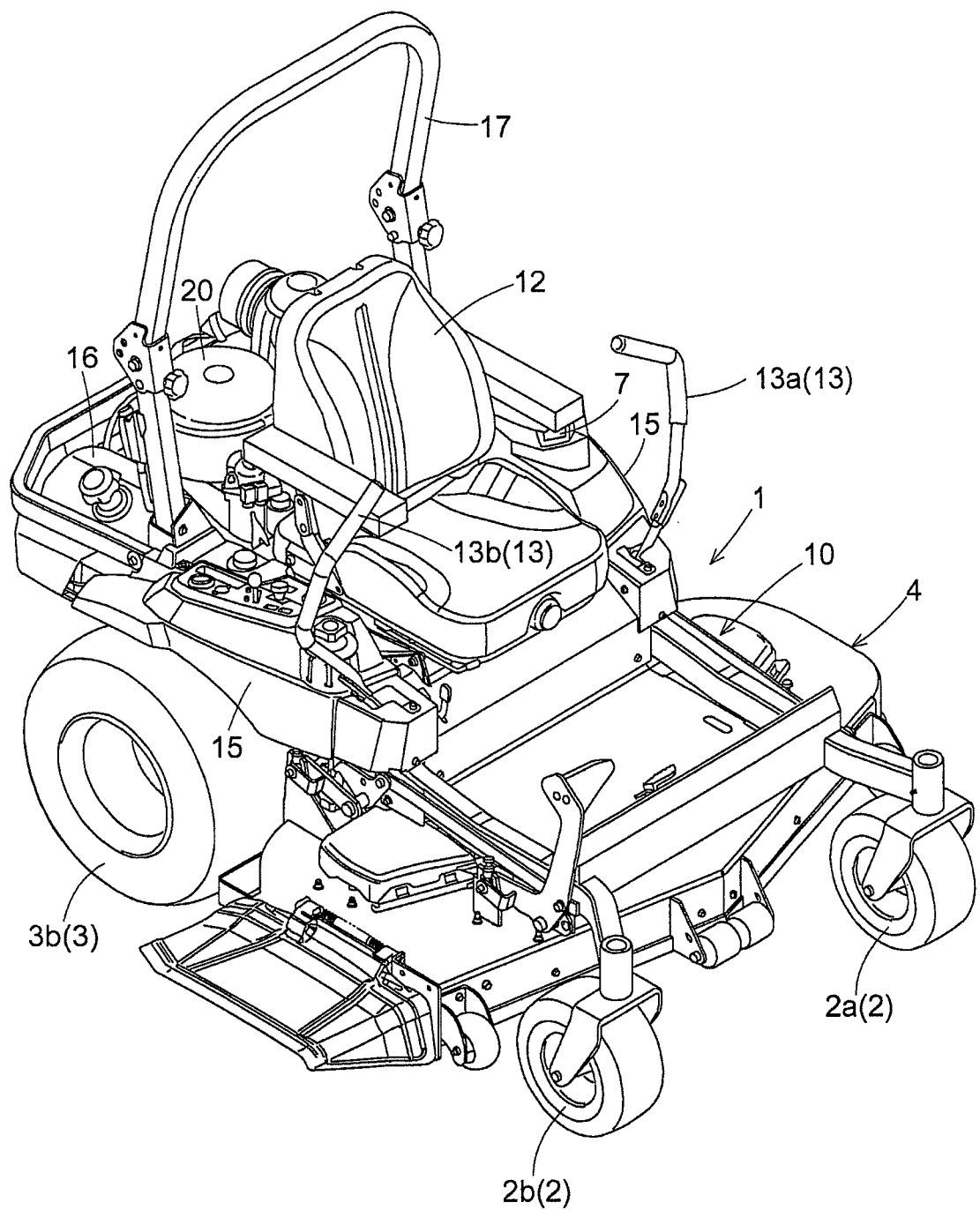
FIG. 1 is a perspective view of a grass mower.
Figure 3:
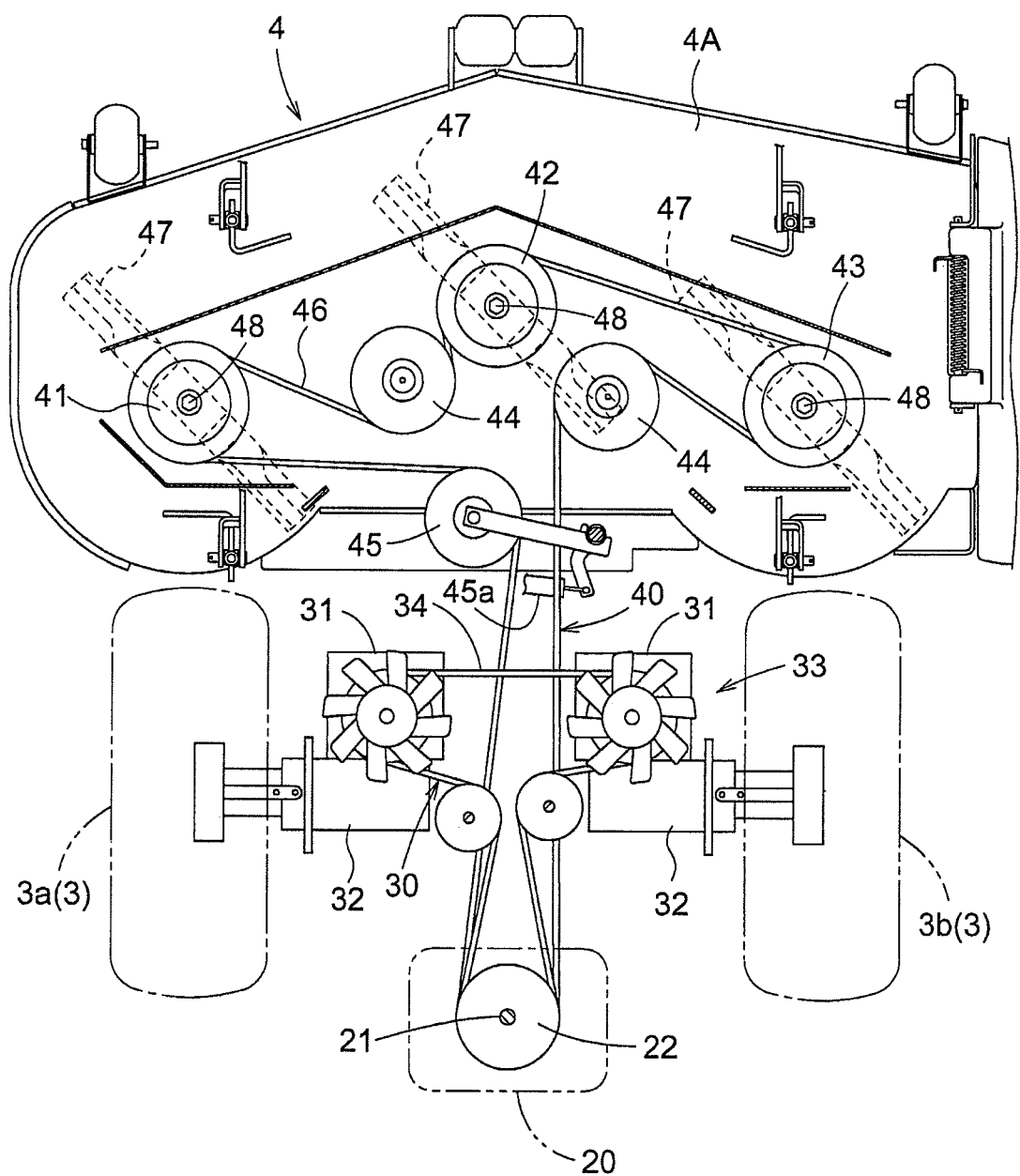
FIG. 3 is a power line diagram of the grass mower.

Next, a grass mower as one embodiment of a work vehicle according to the present invention will be explained with reference to the accompanying drawings. FIG. 1 is a perspective view of the grass mower. FIG. 3 is a power line diagram of the grass mower. In this detailed description, unless indicated otherwise, a word "front" means a front side with respect to a vehicle body front-rear direction (running direction), and a word "rear" means a rear side with respect to the vehicle body front-rear direction (running direction). Further, a left-right direction or a lateral direction means a vehicle body transverse direction (vehicle body width direction) perpendicular to the vehicle body front-rear direction. Also, a word "upper" or "lower" signifies a positional relationship in the perpendicular direction of the vehicle body (vertical direction), thus indicating a relationship respecting the ground height.

The grass mower includes a vehicle body 1 supported on a ground surface by means of a front wheel unit 2 as a caster unit and a rear wheel unit 3 as a running device. This grass mower is a so-called zero-turn mower configured such that a left rear wheel 3a and a right rear wheel 3b together constituting the rear wheel unit 3 are independently controllable in their speeds forwardly and reversely. The front wheel unit 2 includes a left front wheel 2a and a right front wheel 2b. The principal constituent component of the vehicle body 1 is a frame 10 consisting of angular pipe members, or the like. Between the front wheel unit 2 and the rear wheel unit 3, a mower unit 4 as a utility implement is suspended from the frame 10 to be liftable up/down.

The frame 10 extends in a front-rear direction, and at a center portion of the frame 10, a driver's seat 12 is provided. On an upper face of a front portion of the frame 10, a floor plate is mounted, to be used as a footrest for the driver.

An engine 20 for providing rotational power to the rear wheel unit 3 and the mower unit 4 is mounted at a rear portion of the frame 10. This engine 20 consumes fossil fuel such as heavy oil, gasoline, etc. The engine 20 is mounted under a posture with its engine output shaft 21 (see FIG. 3) protruding downwards. Laterally of the engine 20, a fuel tank 16 is mounted.

Figure 2:
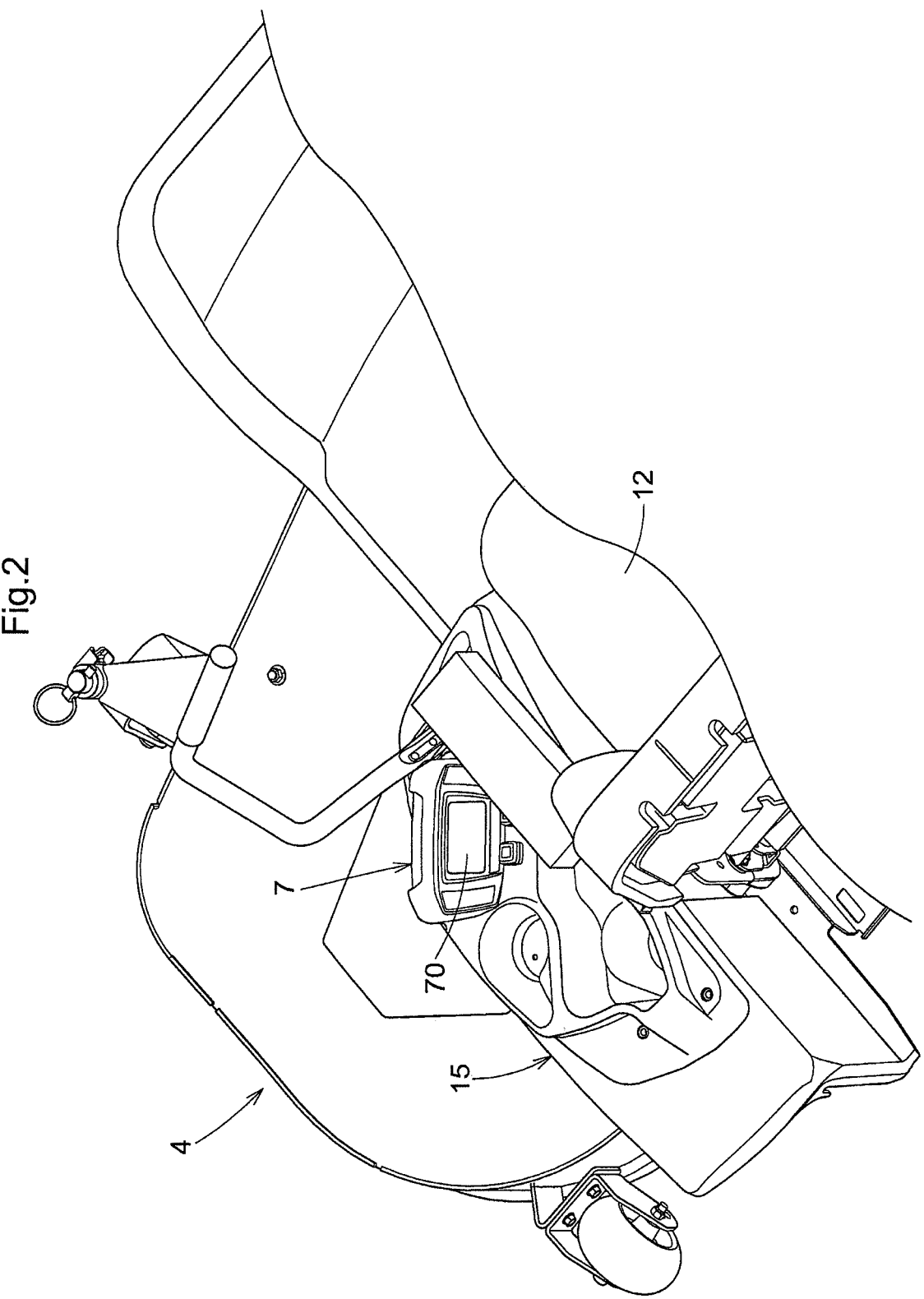
FIG. 2 is a perspective view of a display unit mounted on the grass mower.

Rearwardly of the driver's seat 12, an arch-shaped ROPS 17 is mounted vertically. On the left and right sides of the driver's seat 12, fenders 15 are provided. On the upper faces of the fenders 15, user operational (control) devices such as various kinds of operational (control) levers, operational (control) buttons, etc. are provided. As shown in FIG. 2, on the upper face of the left fender 15, a display unit 7 constituting of liquid crystal or the like is mounted, with its screen 70 facing the face of a driver seated at the driver's seat 12.

A maneuvering unit 13 as one of the user operational devices consists of a left maneuvering lever 13a disposed on the left side of the driver's seat 12 and a right maneuvering lever 13b disposed on the right side of the driver's seat 12. The left maneuvering lever 13a is used for adjusting a rotational speed of the left rear wheel 3a and the right maneuvering lever 13b is used for adjusting the right rear wheel 3b. The left maneuvering lever 13a and the right maneuvering lever 13b can be pivotally displaced to/through/from a forward speed changing region, a neutral, and a reverse speed changing region.

As shown schematically in FIG. 3, the power transmission line includes a running transmission mechanism 30 for transmitting engine power to the rear wheel unit 2 and a PTO mechanism 40 for transmitting engine power to the mower unit 4. Power from the engine 20 is outputted from upper and lower two-stages of output pulleys 22 mounted on the engine output shaft 21.

The running transmission mechanism 30 includes a pair of left and right HST (hydrostatic transmissions) 31, a pair of left and right gear transmission mechanisms 32 and a running belt transmission mechanism 33. The running belt transmission mechanism 33 transmits power outputted from the output pulleys 22 to the HST's 31 via a running belt 34. The gear transmission mechanism 32 transmits power speed-changed by the HST's 31 to the rear wheel unit 3 (left rear wheel 3a, the right rear wheel 3b).

Speed changes by the left and right HST's 31 are effected via control signals generated in response to pivotal operations of the left maneuvering lever 13a and the right maneuvering lever 13b. In response to user operations on the left maneuvering lever 13a and the right maneuvering lever 13b, there are realized, a stopped state, forward running state, a gentle turn state, a pivot turn state and a spin turn state, respectively. The stopped state is realized by stopping the left rear wheel 3a and the right rear wheel 3b. The gentle turn state is realized by driving the left rear wheel 3a and the right rear wheel 3b at different speeds forwardly or reversely. The pivot turn state is realized by stopping one of the left rear wheel 3a and the right rear wheel 3b and driving the other forwardly or reversely. The spin turn state is realized by driving one of the left rear wheel 3a and the right rear wheel 3b forwardly and driving the other reversely.

The mower unit 4 includes a mower deck 4A comprised of a top plate and a side plate. In the inside space of the mower deck 4A, there are mounted three blades 47 juxtaposed in the vehicle body transverse direction as indicated by dotted lines in FIG. 3. Each blade 47 is fixed to a drive shaft 48 supported to the top plate of the mower deck 4A. In order to transmit power from the output pulley 22 of the engine 20 to the respective drive shafts 48, the PTO mechanism 40 is provided. The PTO mechanism 40 includes input pulleys 41, 42, 43 fixed to the drive shafts 48 of the respective blades 47, a turn pulley 44, a tension clutch pulley 45 as an implement clutch, and an implement belt 46 wound around these pulleys. With this arrangement, each blade 47 is rotated at a rotational speed in proportion to an engine rotational speed. The tension clutch pulley 45 is switched into an engaged state or a disengaged state, by a clutch solenoid 45a.

Figure 4:
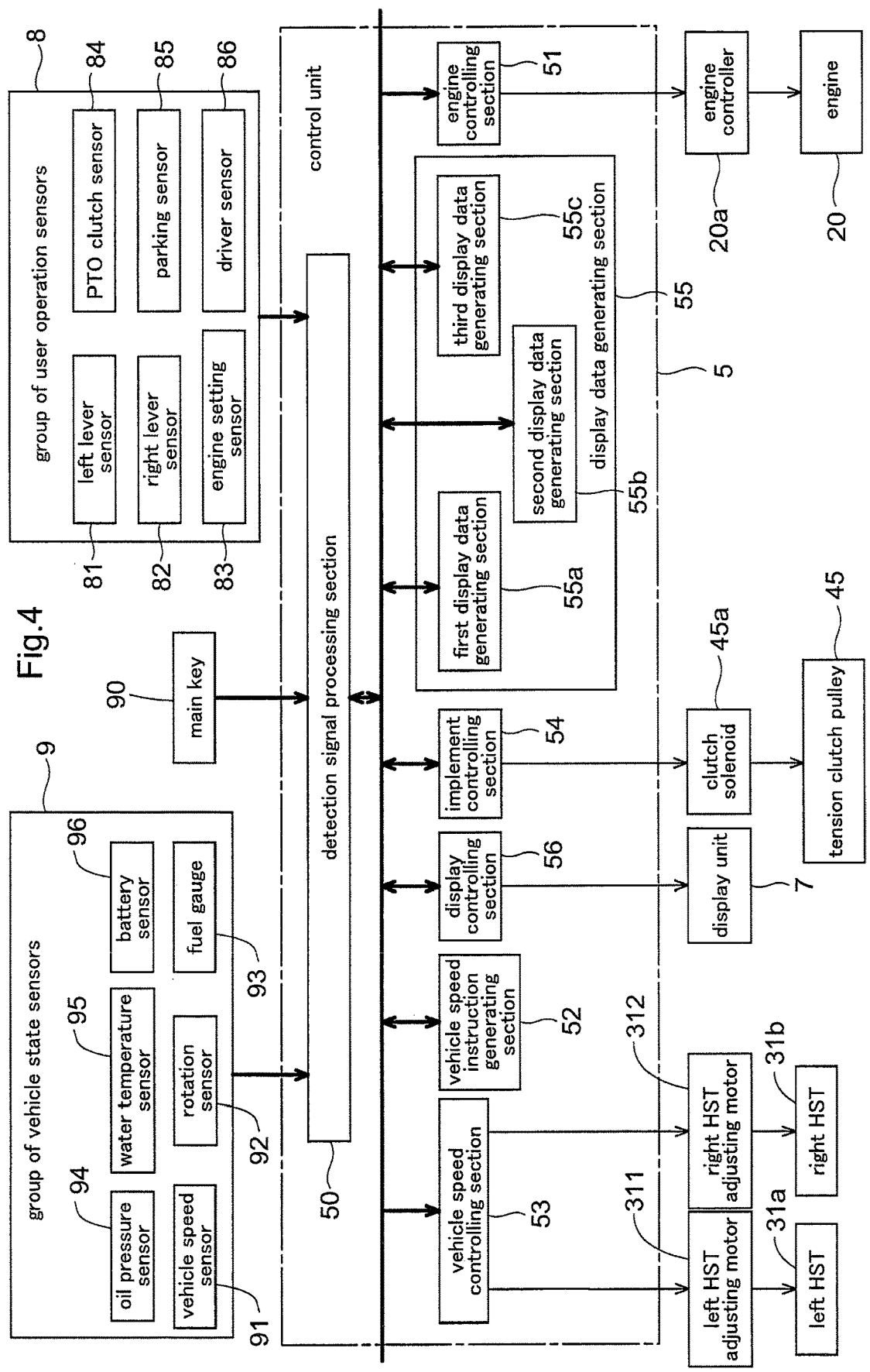
FIG. 4 is a functional block diagram of a control line of the grass mower.

A control line of this grass mower is shown in FIG. 4. FIG. 4 is a functional block diagram of the control line of this grass mower. Incidentally, the respective functional blocks shown in FIG. 4 are provided for the purpose of explanation. Thus, integration, division and addition thereof can be made as desired. The core component of this control line is a control unit 5 which comprises substantially a computer system. The control unit 5 includes a detection signal processing section 50 for processing detection signals from sensor groups disposed at respective positions on the vehicle body 1 and outputting detection result data. Here, the groups of sensors are divided into a group of user operation sensors for detecting user operations and a group of vehicle state sensors for detecting vehicle states.

The group of user operation sensors 8 include a left lever sensor 81 for detecting a pivotal displacement of the left maneuvering lever 13a, a right lever sensor 82 for detecting a pivotal displacement of the right maneuvering lever 13b, an engine setting sensor 83 for detecting set values of engine rotational speed setters (not shown) such as an accelerator lever, a PTO clutch sensor 84 for detecting an engaged state and a disengaged state of the tension clutch pulley 45 as a PTO clutch, a parking brake sensor 85 for detecting a state of the parking brake, a driver sensor 86 for detecting whether a driver is seated at the driver's seat 12 or not, and so on.

The group of vehicle state sensors 9 include a vehicle speed sensor 91 for detecting a vehicle speed which is a running speed of the vehicle body 1, an engine rotational speed sensor 92 for detecting a rotational speed of the engine 20, a fuel gauge 93 for determining a remaining fuel amount inside the fuel tank 3, an oil pressure sensor 94 for detecting an oil pressure, a water temperature sensor 95 for detecting a temperature of cooling water, a battery sensor 96 for detecting a charged state of battery, and so on.

Moreover, to the detection signal processing section 50, a main key 90 is connected. This main key 90 is an ignition switch which allows feeding of electric power to the respective electric components at its ON position and which stops the engine 20 at its OFF position. Such operational positions are provided to the detection signal processing section 50.

Further, to the control unit 5, there are connected the display unit 7, an engine controller 20a, the clutch solenoid 45a, a left HST adjusting motor 311, a right HST adjusting motor 312, and so on. The engine controller 20a adjusts a rotational speed of the engine 20 based on a control signal from the control unit 5. The clutch solenoid 45a effects an engaging/disengaging operation of the tension clutch pulley 45 based on a control signal from the control unit 5. The left HST adjusting motor 311 and the right HST adjusting motor 212 respectively adjust a swash plate angle of the left HST 31a and the right HST 31b, based on a control signal from the control unit 5, thus changing a vehicle speed.

Within the control unit 5, there are configured various functional sections for processing the detection result data outputted from the detection signal processing section 50 and generating data or signals for operating the various devices mounted on this grass mower. As examples of such functional sections, in FIG. 4, there are shown an engine controlling section 51, a vehicle speed instruction generating section 53, a vehicle speed controlling section 53, an implement, controlling section 54, a display data generating section 55, and a display controlling section 56.

The engine controlling section 51 generates control signals, such as a fuel injection amount (fuel supply amount), for controlling a rotational speed of the engine 20 based on a detection signal from the engine setting sensor 83 and provide the signals to the engine controller 20a. The engine controlling section 51 provides engine information including a fuel supply amount and an engine load to the display data generating section 55.

The vehicle speed instruction generating section 52 and the vehicle speed controlling section 53 are provided in case operations using the maneuvering unit 13 are provided in the by-wire method. Whereas, in an embodiment wherein such by-wire method is not employed and the maneuvering unit 13 and the pair of left and right IIST's 31 are connected via physical linkage instead, the vehicle speed instruction generating section 52, the vehicle speed controlling section 53, the left HST adjusting motor 311 and the right HST adjusting motor 312 can be omitted. In the case of the by-wire method, the vehicle speed instruction generating section 52 generates vehicle speed instructions based on detection signals from the left lever sensor 81 and the right lever sensor 82 and then provides them to the vehicle speed controlling section 53. Then, based on the vehicle speed instructions (left vehicle speed instruction, right vehicle speed instruction), the vehicle speed controlling section 53 generates control signals for controlling the rear wheel unit 3. More particularly, a control signal based on a left vehicle speed instruction is provided to the left HST adjusting motor 311. With this, the swash plate angle of the left HST 31a is adjusted so that the left rear wheel 3a provides the vehicle speed based on the user operation. Similarly, a control signal based on a right vehicle speed instruction is provided to the right HST adjusting motor 312. With this, the swash plate angle of the right HST 31b is adjusted so that the right rear wheel 3b provides the vehicle speed based on the user operation.

The implement controlling section 54 provides the clutch solenoid 45a with control signals for effecting engaging and disengaging operations of the tension clutch pulley 45.

The display data generating section 55 generates data that are needed for the display controlling section 56 to output signals and data for driving the display unit 7. The display data generating section 55 includes a first display data generating section 55a for generating time changing data whose data values change over time based on the detection result data outputted from the detection signal processing section 50, a second display data generating section 55b for generating safety data relating to safety confirmation based on the detection result data outputted from the detection signal processing section 50, and a third display data generating section 55c for generating alarm data relating to alarms based on the detection result data outputted from the detection signal processing section 50.

Here, the time changing data are such data indicative of e.g. an engine rotational speed, a water temperature, an engine load ratio, a remaining fuel amount in the fuel tank, a momentary fuel consumption amount, a total fuel consumption amount, an hour meter value. Incidentally, the momentary fuel consumption amount is calculated while the main key 90 stays at its ON position, namely, during driving of the engine 20. This momentary fuel consumption amount is calculated as a fuel consumption amount per unit period (suitably, from a few seconds to a few minutes), based on a fuel supply amount to the engine 20.

The safety data are such data indicative of a seated state of a driver at the driver's seat 12, an operational state of the parking brake, neutral confirmation of the left maneuvering lever 13a and the right maneuvering lever 13b, a PTO state, etc. The alarm data are such data indicative of an overheated state, a battery exhaustion, a fuel exhaustion, an oil pressure shortage, an engine oil exhaustion, etc.

Figure 5:
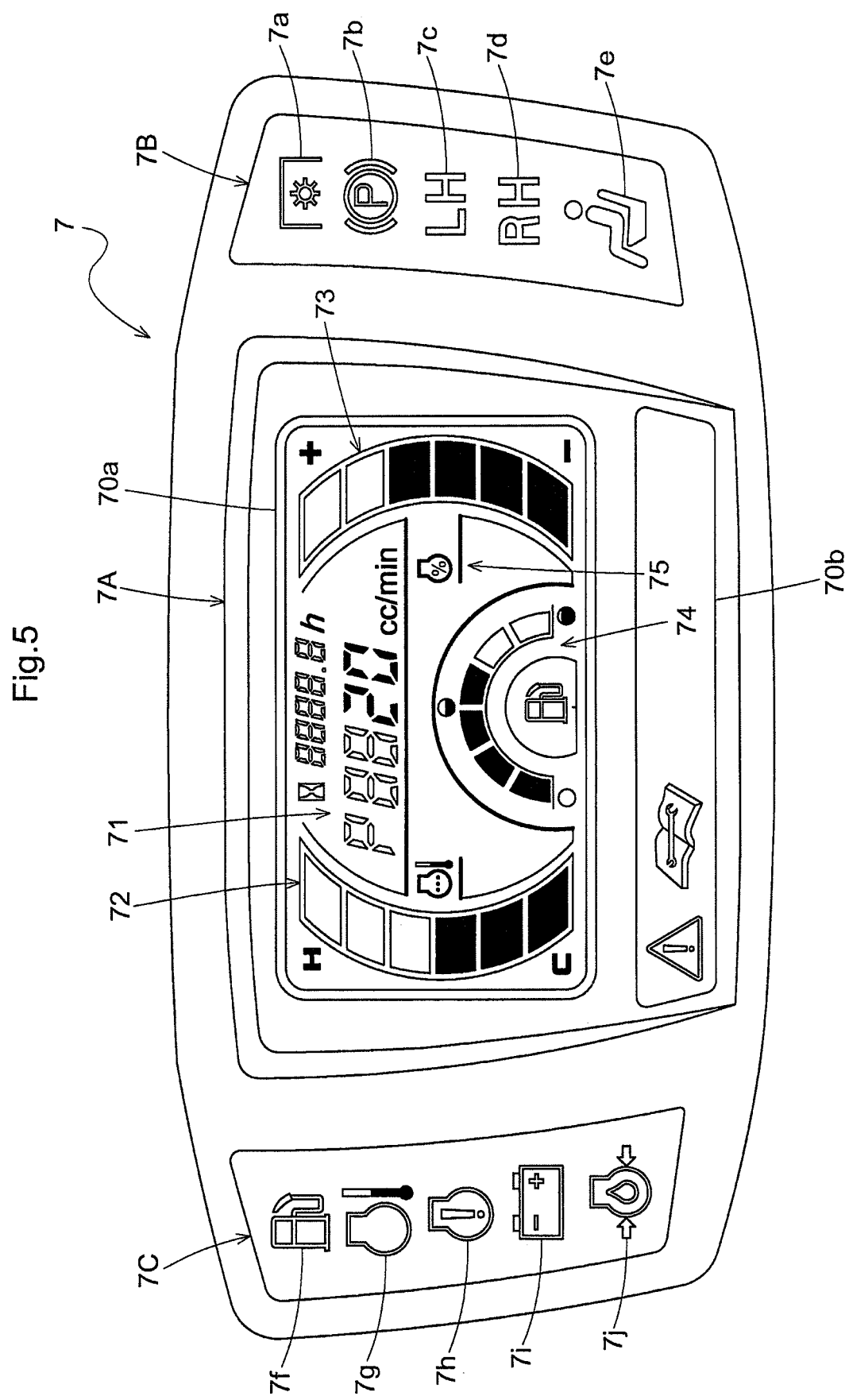
FIG. 5 is a view of display screen showing one example of a screen of the display unit.

In this embodiment, the display unit 7, as shown in FIG. 5, consists of a liquid crystal displaying section 7A, a right LED lamp displaying section 7B located on the right side of the liquid crystal displaying section 7A, and a left LED lamp displaying section 7C located on the left side of the same. The liquid crystal displaying section 7A is divided into an upper screen 70a and a lower screen 70b located on the lower side of the upper screen 70a. The upper screen 70a is used as a time changing data displaying area (a first displaying area) for displaying changing data whose values change over time in the form of a graph or numerals. This upper screen 70a is divided into a first segment 71, a second segment 72, a third segment 73 and a fourth segment 74. The first segment 71 employs upper and lower two rows of seven-segment numbers. In this embodiment, the upper-row segment number in the first segment 71 displays a total operation period, whereas the lower-row segment number selectively displays one of the momentary fuel consumption amount, the total fuel consumption amount and the engine rotational speed. In this, as an identifier 75 for identifying a selected data kind, a unit symbol or an icon will be displayed simultaneously.

The left-side arcuate second segment 72 displays a water temperature of engine cooling water. The right-side arcuate third segment 73 displays an engine load ratio. The lower-side semi-circular fourth segment 74 displays a remaining fuel amount in the fuel tank. The lower screen 70b is a band-like liquid crystal area for displaying mainly a message, an alarm for the driver.

The right LED lamp displaying section 7B and the left LED lamp displaying section 7C respectively are configured such that by illuminating an icon provided on its surface with an LED lamp, the icon is highlighted for reporting an item content meant by the ion to the driver.

The right LED lamp displaying section 7B is used as a safety displaying section (a second displaying area) for displaying safety data relating to safety confirmation, in which a first LED 7a, a second LED 7b, a third LED 7c, a fourth LED 7d and a fifth LED 7e are disposed in this order from the upper side. The LED lamps of the safety displaying section are illuminated in green. In this embodiment, the first LED 7a is provided with an icon indicating a drive state of the PTO, the second LED 7b is provided with an icon indicating an ON state of the parking brake, the third LED 7c is provided with an icon (a mark: LH) indicating neutral of the left maneuvering lever 13a, the fourth LED 7d is provided with an icon (a mark: RH) indicating neutral of the right maneuvering lever 13b, and the fifth LED 7e is provided with an icon indicating a seating of a driver, respectively. By illuminations of the respect LED lamps of the right LED lamp displaying section 7B, it is possible to confirm that staring of engine 20 will not present any problem. For instance, if the left neutral icon 76 and the right neutral icon 77 are displayed, this means that left maneuvering lever 13a and the right maneuvering lever 13b are under the neutral state. So, under this state, an operation of the main key 90 to start the engine 20 will not result in inadvertent movement of the vehicle body 1. Whereas, if either one of the left maneuvering lever 13a and the right maneuvering lever 13b is not under the neutral state, there is the possibility of inadvertent movement of the vehicle body 1. So, there is provided a safety control measure for not starting the engine 20. If the main key 90 is operated to attempt starting of the engine 20, but the engine 20 is not started, by checking at least one of the left neutral icon and the right neutral icon is not illuminated, the cause of this starting failure can be grasped.

The left LED lamp displaying section 7C is used as an alarm displaying section (a third displaying area) for displaying alarm data indicating result of alarm, in which a sixth LED 7f, a seventh LED 7g, an eighth LED 7h, a ninth LED 7i and a tenth LED 7j are disposed in this order from the upper side. The LED lamps of the alarm displaying section are illuminated in red or amber. In this embodiment, the sixth LED 7f is provided with an icon indicating fuel exhaustion, the seventh LED 7g is provided with an icon indicating overheat, the eighth LED 7h is provided with an icon indicating an engine trouble, the ninth LED 7i is provided with an icon indicating battery charging trouble, and the tenth LED 7j is provided with an icon indicating oil pressure shortage. By illumination of even one of the LED lamps of the left LED lamp displaying section 7C, it is possible to confirm presence of a trouble that disables vehicle run, together with its reason.

In the foregoing embodiment, a grass mower was described as an example of a work vehicle. However, the present invention is applicable to various kinds of work vehicle such as snow plow vehicle, a liquid agent sprinkling vehicle, etc.

EXPLANATION OF REFERENCE CHARACTERS

FIG. 4
9: group of vehicle state sensors
94: oil pressure sensor
95: water temperature sensor
96: battery sensor
91: vehicle speed sensor
92: rotation sensor
93: fuel gauge
90: main key
8: group of user operation sensors
81: left lever sensor
82: right lever sensor
83: engine setting sensor
84: PTO clutch sensor
85: parking sensor
86: driver sensor
50: detection signal processing section
5: control unit
53: vehicle speed controlling section
52: vehicle speed instruction generating section
56: display controlling section
54: implement controlling section
55a: first display data generating section
55b: second display data generating section
55c: third display data generating section
51: engine controlling section
55: display data generating section
311: left HST adjusting motor
312: right HST adjusting motor
31a: left HST
31b: right HST
7: display unit
45a: clutch solenoid
45: tension clutch pulley
20a: engine controller
20: engine

The invention claimed is:
1. A work vehicle comprising:
a group of sensors mounted on a vehicle body;
a detection signal processing section for processing detection signals from the group of sensors and outputting detection result data; and
a display unit for displaying the detection result data, the display unit including:
a first displaying area for displaying time changing data in numerical or graphical form and included in the detection result data, the time changing data changing over time,
a second displaying area for displaying safety data as illuminated icons arranged one above the other and included in the detection result data, the safety data relating to safety confirmation, and
a third displaying area for displaying alarm-relating data as illuminated icons arranged one above the other and included in the detection result data,
wherein the first displaying area displays only time changing related data, the second displaying area displays only safety data and that the third-displaying area displays only alarm-relating data,
wherein the second displaying area is located exclusively on one lateral side of the first displaying area and the third displaying area is located exclusively on an opposite lateral side of the first displaying area,
wherein the first displaying area comprises a liquid crystal display, whereas the second displaying area and the third displaying area comprise LED lamps with icon, respectively,
wherein:
the first displaying area is divided into a circular center area, crescent-shaped left and right areas facing each other, a circular center area delimited by a right side of the left area and the left side of the right area, and a semi-circular lower extending into a lower portion of the center area; and
data displaying modes in the left area, the right area and the lower area are accurate-shaped bar graphs, whereas data displaying mode at the upper portion of the center area is 7-segment number displaying mode, and
wherein the safety data includes:
a parking brake indicator;
a PTO indicator;
a seating indicator;
a left handle indicator; and
a right handle indicator.
2. The work vehicle of claim 1, wherein the LED lamp of the second displaying area is configured to be illuminated in green whereas the LED lamp of the third displaying area is configured to be illuminated in red or amber.
3. The work vehicle of claim 1, wherein the time changing related data includes:
graphs and numbers.
4. The work vehicle of claim 1, wherein the time changing related data includes at least:
hours of operation;
fuel consumption or level;
engine rotational speed.

5. The work vehicle of claim 1, wherein the safety data includes icons.

6. The work vehicle of claim 1, wherein the alarm-relating data includes exclusively illuminated icons.

7. The work vehicle of claim 1, wherein the alarm-relating data includes at least:
a fuel indicator;
a temperature indicator; and
a battery indicator.

8. The work vehicle of claim 1, wherein the alarm-relating data includes:
a fuel indicator;
a temperature indicator;
a engine indicator;
a battery indicator; and
a oil indicator.

9. A work vehicle comprising:
a group of sensors mounted on a vehicle body;
a detection signal processing section for processing detection signals from the group of sensors and outputting detection result data; and
a display unit for displaying the detection result data, the display unit including:
 a centrally disposed first displaying area configured for displaying time changing data in both numeric and graphical form and included in the detection result data, the time changing data changing over time,
 a second displaying area configured for displaying safety data exclusively as illuminated icons and included in the detection result data, the safety data relating to safety confirmation, and
 a third displaying area having a shape comparable to the second displaying area and being configured for displaying alarm-relating data exclusively as illuminated icons and included in the detection result data,
wherein the first displaying area is larger in area that the second and third displaying areas and displays only time changing related data, the second displaying area displays only safety data and that the third-displaying area displays only alarm-relating data,
wherein the second displaying area is located exclusively on one lateral side of the first displaying area and the third displaying area is located exclusively on an opposite lateral side of the first displaying area,
wherein the first displaying area comprises a liquid crystal display, whereas the second displaying area and the third displaying area comprise LED lamps with icon, respectively,
wherein:
 the first displaying area is divided into a circular center area, crescent-shaped left and right areas facing each other, a circular center area delimited by a right side of the left area and the left side of the right area, and a semi-circular lower extending into a lower portion of the center area; and
 data displaying modes in the left area, the right area and the lower area are accurate-shaped bar graphs, whereas data displaying mode at the upper portion of the center area is 7-segment number displaying mode, and
wherein the safety data includes:
 a parking brake indicator;
 a PTO indicator;
 a seating indicator;
 a left handle indicator; and
 a right handle indicator.

10. The work vehicle of claim 8, wherein:
the time changing related data includes:
 graphs oriented vertically; and
 numbers oriented horizontally;
the safety data comprise multiple vertically oriented illuminated icons; and
the alarm-relating data comprise multiple vertically oriented illuminated icons.

11. A work vehicle comprising:
a group of sensors mounted on a vehicle body;
a detection signal processing section for processing detection signals from the group of sensors and outputting detection result data; and
a display unit for displaying the detection result data, the display unit including:
 a centrally disposed first displaying area configured for displaying time changing data as graphs and numbers and included in the detection result data, the time changing data changing over time,
 a second displaying area configured for displaying safety data exclusively as illuminated icons arranged one above the other and included in the detection result data, the safety data relating to safety confirmation, and
 a third displaying area configured for displaying alarm-relating data exclusively as illuminated icons arranged one above the other and included in the detection result data,
wherein the first displaying area:
 comprises plural different shaped displaying areas,
 is larger in area than the second and third displaying areas; and
 displays only time changing related data,
wherein the second displaying area:
 displays only safety data, and
 is located exclusively on one lateral side of the first displaying area, and
wherein the third-displaying area:
 displays only alarm-relating data,
 has a comparable shape to that of the second displaying area; and
 is located exclusively on an opposite lateral side of the first displaying area,
wherein the first displaying area comprises a liquid crystal display, whereas the second displaying area and the third displaying area comprise LED lamps with icon, respectively,
wherein:
 the first displaying area is divided into a circular center area, crescent-shaped left and right areas facing each other, a circular center area delimited by a right side of the left area and the left side of the right area, and a semi-circular lower extending into a lower portion of the center area; and
 data displaying modes in the left area, the right area and the lower area are accurate-shaped bar graphs, whereas data displaying mode at the upper portion of the center area is 7-segment number displaying mode, and
wherein the safety data includes:
 a parking brake indicator;
 a PTO indicator;
 a seating indicator;
 a left handle indicator; and
 a right handle indicator.

12. The work vehicle of claim 11, wherein:
the time changing related data includes:
 two graphs; and
 numbers arranged between the two graphs;
the safety data comprise multiple illuminated icons; and
the alarm-relating data comprise multiple illuminated icons.

\* \* \* \* \*

UNITED STATES PATENT AND TRADEMARK OFFICE
CERTIFICATE OF CORRECTION

PATENT NO. : 11,140,814 B2
APPLICATION NO. : 15/984860
DATED : October 12, 2021
INVENTOR(S) : D. Spitz et al.

It is certified that error appears in the above-identified patent and that said Letters Patent is hereby corrected as shown below:

In the Claims

At Column 9, Line 15 (Claim 8, Line 5), please change "a" to -- an --.
At Column 9, Line 17 (Claim 8, Line 7), please change "a" to -- an --.
At Column 9, Line 37 (Claim 9, Line 20), please change "that" to -- than --.

Signed and Sealed this
Nineteenth Day of April, 2022

Katherine Kelly Vidal
*Director of the United States Patent and Trademark Office*